United States Patent [19]
Guild

[11] 3,870,492
[45] Mar. 11, 1975

[54] APPARATUS FOR COLLECTING SAMPLES OF CONTAMINANTS

[76] Inventor: Lloyd V. Guild, 358 Park Rd., Bethel Park, Pa. 15102

[22] Filed: Aug. 9, 1973

[21] Appl. No.: 387,016

[52] U.S. Cl. ............................................. 55/387
[51] Int. Cl. ........................................... B01d 53/04
[58] Field of Search ....... 55/74, 274, 275, 316, 317, 55/318, 387; 210/282

[56] References Cited
UNITED STATES PATENTS

| | | | |
|---|---|---|---|
| 2,071,811 | 2/1937 | Bartuska et al. | 55/318 |
| 2,614,650 | 10/1952 | Chandler et al. | 55/387 |
| 2,770,317 | 11/1956 | Bottum | 210/282 |
| 2,838,795 | 6/1958 | Lockwood | 55/387 |
| 3,246,758 | 4/1966 | Wagner | 210/282 |
| 3,411,629 | 11/1968 | Wilber et al. | 210/282 |
| 3,464,186 | 9/1969 | Hankison et al. | 55/387 |

Primary Examiner—Charles N. Hart
Attorney, Agent, or Firm—Hymen Diamond

[57] ABSTRACT

A tube having therein spaced layers of particled activated charcoal, one layer being between air-permeable blocks of poly-urethane foam and the other between one of the blocks and a mass of glass wool. To minimize irregularity in the flow of air through the tube the quantity of glass wool is a minimum, just sufficient to cover the layer. The glass wool is engaged by a U-shaped spring with diverging legs which secures the glass wool, layers and blocks firmly in place and prevents movement of particles of charcoal along the tube. The sampled air is passed through the tube, the charcoal absorbing the samples. With the layers and blocks held firmly in place the flow of the sampled air is uniform and the pressure drop across the array in the tube remains constant. Tubes of this type are interchangeable because they have reproducible flow and pressure drop characteristics.

2 Claims, 3 Drawing Figures

PATENTED MAR 11 1975   3,870,492

APPARATUS FOR COLLECTING SAMPLES OF CONTAMINANTS

REFERENCE TO RELATED DOCUMENTS

White, Taylor, Mauer, Rupel, *A Convenient Optimized Method For the Analysis of Selected Solvent Vapors In The Industrial Atmosphere*, American Industrial Hygiene Association Journal, Vol. 31, March–April, 1970, pgs. 225–232.

BACKGROUND OF THE INVENTION

This invention relates to the art of detecting, and measuring the quantities of, contaminants in fluids and has particular relationship to the sampling of substantial measured quantities of fluids to derive sample quantities of contaminants from the fluids. In the interest of concreteness this application deals predominately with contaminants in the atmosphere of industrial plants. However, to the extent that this invention is applicable to the sampling of other fluids than air, for example water, such sampling is intended to be within the scope of this application.

The hazardous contaminants present in the atmosphere of industrial plants has long been the concern of employers, labor unions and the employes themselves, and the general public. Impetus to the efforts to avoid or reduce contaminants has been added by the Williams-Steiger Act of 1970 (Act 91-596) which is called the Occupational Safety and Health Act (OSHA). OSHA lists a number of hazardous chemicals which may exist in the atmosphere of a plant depending on its operations, and the "Threshold Limit Values" (TLV) of these chemicals in parts per million. Typically the TLV for benzene is 25 ppm, for toluene 200 ppm and for trichlorethylene 100 ppm. These are average TLVs about which the actual values swing. The permissible upper limit is a small multiple of TLV which would be 2 for benzene (50 ppm) 1.25 for toluene and 1.5 for trichlorethylene but the average TLVs over an 8 hour period of time must be maintained. The permissible quantities of these contaminants are in any event very small and the precise reliable measurement of such small quantities presents, at the outset, the difficult problem of collecting samples of the contaminants for measurement whose quantity must be known precisely. It is an object of this invention to provide apparatus for sampling fluids, particularly the atmosphere of industrial plants, to derive quantities of contaminants whose magnitudes shall be known accurately and reliably.

In accordance with the teachings of the prior art, as typified by White et al., identified above, known quantities of the air being sampled is passed through particled activated charcoal which adsorbs the contaminants and from which the contaminants are subsequently desorbed. Spaced layers of charcoal particles are provided in a sampling tube which typically may have an inner diameter of about 4 millimeters and an outer diameter of about 6 millimeters. A known quantity, say 10 liters, of the sampled gas is passed through the layers in the tube. The tube is then broken and the charcoal of each layer desorbed separately with carbon disulfide. Each $CS_2$ solution is analyzed for its solutes. If the layer downstream of the sampled gas during the sampling contains measureable quantities of contaminants, the test is discarded. If the downstream layer is free of contaminants, a determination is made of the contaminants in the atmosphere based on the upstream layer. Typically this apparatus with the particulated charcoal serves for detection, and determination of the content, of such contaminants as:

Benzene
Carbon Tetrachloride
Chloroform
Dioxane
Ethylene Dichloride
Trichlorethylene
1,1,2-trichlorethane
1,1,1-trichlorethane
Tetrachlorethylene
Toluene
Styrene
Xylene For reliable determination of contaminant content in the atmosphere it is essential that, in different tubes, the flow of sampled gas through the charcoal be uniform, typically about 1 liter per minute, and the pressure drop of the gas across the contents of the tube be constant, typically about 1 inch of mercury. The uniform flow and constant drop in different tubes through different layers of charcoal permits meaningful comparison of the data derived by different workers with different apparatus. This uniformity and constancy has not been achieved with prior art apparatus.

It is an object of this invention to overcome the abovedescribed disadvantage of the prior art and to provide reliable apparatus for precisely sampling fluids for contaminants in whose use the flow of the fluid through the sampling tube shall be uniform and the pressure drop of the fluid across the contents of the tube shall be constant.

SUMMARY OF THE INVENTION

In the use of the sampling tubes it has been found that unless the charcoal layers are held firmly in the tube, the charcoal particles become disengaged from the wall of the tube and are displaced along the tube. The sampled gas then tends to flow predominately, or to a large extent, not through the charcoal but between the charcoal and the wall of the tube and the absorption of contaminants is not effective. Attempts have been made to secure the layers in the tube by engaging the upstream layer with a substantial mass of glass wool or like porous material but in such apparatus the flow of the sampled gas is not uniform nor is the pressure drop constant. This invention arises from the realization that this non-uniformity and pressure variation is caused by the irregularity of the gas-flow paths through the glass wool.

In accordance with this invention the upstream layer is covered with a minimum mass of porous material or material formed of strands randomly distributed and this mass is secured by resilient means so that the layers of adsorbent are held firmly. The pores or spacings between the strands of the porous material predominately have cross-sectional areas which are smaller than the smallest cross-sectional areas of the particles of the adsorbent. The quantity of porous material should be just sufficient to cover the upstream layer and prevent dislodgement of its particles. This invention is not confined to the sampling only of air but is applicable to the sampling of other fluids, water for example. Nor is this invention confined to apparatus whose adsorbent is charcoal; it is applicable to apparatus with other adsorbents, as well as chemical absorbents.

BRIEF DESCRIPTION OF THE DRAWING

For a better understanding of this invention, both as to its organization and as to its method of operation, together with additional objects and advantages thereof, reference is made to the following description, taken in connection with the accompanying drawing, in which.

DETAILED DESCRIPTION OF EMBODIMENT

Figure 1:
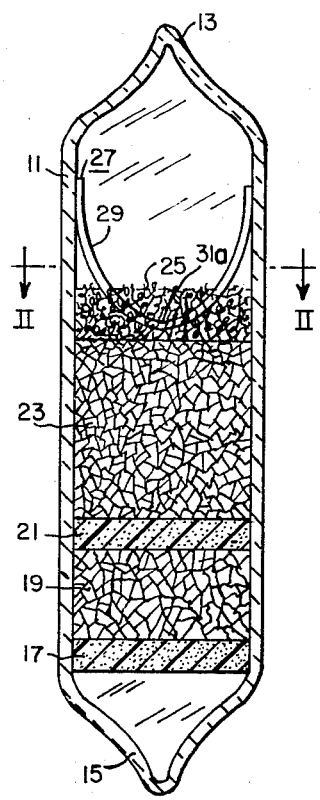
FIG. 1 is a view in longitudinal section of an embodiment of this invention.
Figure 2:
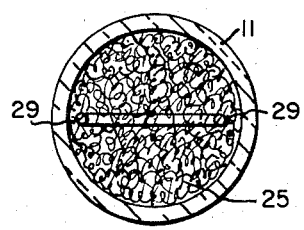
FIG. 2 is a view in section taken along line II—II of FIG. 1.

The apparatus shown in FIGS. 1 and 2 includes a tube 11 of glass or the like sealed at both ends 13 and 15. The tube may have an inner diameter of 4 mm and an outer diameter of 6 mm. There are arrayed in this tube, from the end of seal 15 to the end of seal 13, a cylindrical block 17 of fluid-permeable material, a layer 19 of particled contaminant-adsorbent material, another cylindrical block 21 of fluid-permeable material, another layer 23 of particled contaminant-adsorbing material and a mass 25 of porous or stranded material.

Typically the blocks 17 and 21 are composed of polyurethane foam, have heights of 3 mm and 2 mm respectively, and a diameter such that they are tightly held in the tube 11. The layers 19 and 23 are typically composed of particled activated charcoal of reasonable consistency and whose particles are reasonably of uniform mesh. Typically, the size of the particles ranges narrowly around 25 or 30 U.S. Standard Mesh. Layer 19 typically contains about 50 milligrams of charcoal and layer 23, 100 milligrams. Typically, the mass 25 is composed of glass wool. The areas defined between the strands of the mass 25, sometimes herein called the cross-sectional areas of the pores, are predominately smaller than the smallest cross-sectional diameter of the particles of layer 23. The quantity of glass wool in the mass 25 is minimized and is just sufficient to cover the layer 23. Typically, this quantity is between 8 and 10 milligrams.

Figure 3:
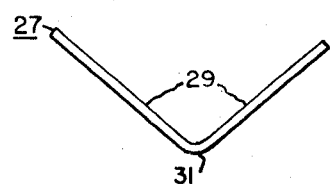
FIG. 3 is a view in side elevation of the spring used in the practice of this invention before insertion in the tube.

The mass 25 is engaged by a spring 27 which holds the array 17, 19, 21, 23, 25 firmly in position. The spring 27, before it is inserted in the tube 11 is V-shaped with diverging legs 29 and apex 21. In the tube the spring 27 is of U-shape with legs 29 generally parallel and the apex 31 engaging the mass 25 bowed in the form of an extended arc 31a. The inner wall of tube 11 compresses the legs 29 transmitting pressure to the apex 31 to hold the array 17, 19, 21, 23, 25. Typically, the spring 27 (FIG. 3) is formed of wire of 0.012 to 0.016 inch diameter and of developed length of 7/16 inch. The angle between the legs 29 is about 80° and the distance between the legs 29 before insertion in the tube 11 is about 9 millimeters.

In producing the sampling apparatus a tube of appropriate diameter and length is sealed off. Usually each sealing operation produces two tubes 11, each having the seal 15 but open at the opposite end. The components 17, 19, 21, 23, 25 are then inserted successively through the open end. The spring 27 is then inserted and compressed against the wall of the tube 11. The open end is then sealed at 13. This seal 13 is as near as practicable to the mass 25; typically the mass 25 is about one-fourth inch from the seal 13. The heat from the sealing operation raises the temperature of the mass 25 substantially and it is desirable that the mass 25 should not melt or deteriorate in the heat. For this reason a material, such as glass wool, which resists melting or deterioration is used for the mass 25.

In the use of the sampling apparatus, the seals 13 and 15 at the ends are broken, the open end at 15 is connected to a pump and the open end at 13 is exposed to the atmosphere. Typically, ten liters of air are passed through the tube 11, typically, at the rate of about 1 meter per minute while the drop across the components 17–25 is about 1 inch of mercury. Layer 23 is said to be on the up-stream side of the air flow and layer 19 on the down-stream side. The tube 11 is then capped and removed to a laboratory where it is broken and the contaminants adsorbed in the layers 19 and 23, if any, are each desorbed typically with carbon disulfide. The $CS_2$ solutions are analyzed and in the absence of contaminants in the solution from layer 19, the analysis of the solution from layer 23 constitutes a determination of the contaminants in the atmosphere.

It is emphasized that while the above description is confined to activated charcoal adsorbents to which this invention is uniquely applicable, the use of other adsorbents and absorbents, both for air and for other fluids, gaseous or liquid, is within the scope of this invention. The adsorbent or absorbent should be a material capable of adsorbing or absorbing the contaminants of interest and of being readily and reasonably completely desorbed by a solvent.

While preferred embodiments of this invention have been disclosed herein, many modifications thereof are feasible. This invention then is not to be restricted except as is necessitated by the spirit of the prior art.

I claim:

1. The method of making apparatus for collecting samples with a hollow tube sealed at one end thereof and open at the other end thereof, and a generally V-shaped spring having legs diverging from an apex, the distance between said legs being substantially smaller than the inside diameter of said tube, the said method comprising inserting in said tube, across the entire cross-section thereof, at least one layer of particled contaminant-adsorbing or absorbing material, depositing on said layer a mass of permeable material, the cross-sectional area of the pores of said mass being predominately smaller than the smallest cross-sectional area of the particles of said adsorbing or absorbing material, the quantity of said mass being minimized and just sufficient to cover the surface of said layer, inserting said spring in said tube so that its legs engage, and are compressed by, the inner walls of said tube and said apex resiliently engages said mass, the compression of said spring by said walls converting said V-shaped spring into a U-shaped spring with its apex engaging said mass over an extended area, and said compression also causing said spring to exert pressure to hold said mass.

2. Apparatus for collecting samples of contaminants in the fluid of a region comprising a tube through which said fluid is to flow having therein, at least one layer of particulated contaminant-adsorbing or absorbing material, said layer extending throughout the whole cross-section of said tube, a mass of permeable material in said tube engaging said layer, said mass being permeable but the cross-sectional area of the pores in said mass being predominately smaller than the smallest cross-sectional area of the particles of said adsorbing or absorbing material, and a U-shaped spring having an apex engaging said mass and having legs engaging, and compressed by, the walls of said tube and by the compression exerted by said walls causing said apex to exert a force on said mass to preclude movement of said mass away from said layer and this movement of the particles of said adsorbing or absorbing material away from said layer along said tube, the developed length of the spring being greater than twice the inner diameter of the tube.

* * * * *